April 15, 1958 E. HUDES ET AL 2,830,759

DATA HANDLING SYSTEM

Filed Oct. 23, 1953 2 Sheets-Sheet 1

INVENTORS
ELLIS HUDES &
WALDEMAR SAEGER
BY Morris Rabkin
ATTORNEY

DATA HANDLING SYSTEM

Filed Oct. 23, 1953 2 Sheets-Sheet 2

INVENTORS
ELLIS HUDES &
WALDEMAR SAEGER
BY Morris B. Rabkin
ATTORNEY

United States Patent Office 2,830,759

Patented Apr. 15, 1958

2,830,759

DATA HANDLING SYSTEM

Ellis Hudes, Haddonfield, and Waldemar Saeger, Gloucester, N. J., assignors to Radio Corporation of America, a corporation of Delaware Application October 23, 1953, Serial No. 387,886

8 Claims. (Cl. 235—61.11)

This invention relates to data handling systems, and more particularly to a device for reading and utilizing information stored on punched cards.

Punched or perforated statistical cards, which are also known as Hollerith cards, are widely used in modern data processing systems for the storage and manipulation of information. In one often employed system, holes are selectively punched at any of a large number of predetermined card locations. The locations are disposed in vertical columns and horizontal rows, such that individual characters may be represented by significant punchings within a column. A group of characters, such as a word, is composed of a sequence of character perforations.

The arrangement of information on these cards must necessarily conform to the techniques used in a particular card handling system. Thus the number of available message units is usually limited by card size, although no provision need be made for separating information between cards. Likewise, the sequence of the message units within a card must be such that the cards can be punched logically and in orderly fashion.

Such factors necessarily differentiate the method of recording on punched cards from the method of recording on punched paper or magnetic tape. Thus when it is desired in an information handling system to transcribe the stored information from cards to tape, provision must often be made for rearrangement of the characters and insertion of special data. In addition, the punched card code is usually converted to a multiple digit code more suitable for tape recording. This code notation is ordinarily in the binary system for both numeric and alphabetic characters, while numerical characters in the punched card system referred to are in a modified decimal notation.

The usual methods of sensing the information on punched cards are to sequentially scan the vertical columns of a card by passing the card between contact brushes or photoelectric sensing elements. These methods, however, require complicated storage and control circuits to rearrange characters and insert special data. Furthermore, when contact brushes are used as the sensing elements in a high-speed operation, difficulties are encountered because of the tendency of the brushes to vibrate and inadequately sense all the punchings.

Therefore, an object of this invention is to provide an improved means for transcribing information from punched cards to tape.

It is a further object of this invention to provide a device for sensing, revising, and converting the information recorded on punched cards which is simpler than prior punched card to code converters.

Another object of this invention is to provide an improved and superior mechanism for the high-speed sensing of punched cards.

It is still another object of this invention to provide a simple and improved means for rearranging information recorded on punched cards which does not require an intermediate storage of the information.

A further object of this invention is to provide an economical and improved system for transcribing information from punched cards to tape in a rearranged order and with the insertion of additional data, and for coordinating the movement of cards and tape.

These and other objects of this invention are accomplished by simultaneously contacting all the punching positions in a card and providing sensing pulses to the positions in the order desired. In a preferred embodiment of the invention, the card reading pulses originate at a commutator, one complete cycle of which provides sufficient pulses for the total number of characters desired. These pulses are rearranged at a plugboard, from which pulses are supplied in a selected order to particular columns in the sensing mechanism or to fixed data input points in circuit with the sensing mechanism outputs. The signals so obtained at the sensing mechanism outputs, and signals added for message identification, are supplied to a code translator which converts from the punched card code to the tape code. Additional provision is made for governing the tape motion by the presence of cards in the system.

The novel features of the invention as well as the invention itself, both as to its organization and method of operation, will best be understood from the following description when read in connection with the accompanying drawings, in which like reference numerals refer to like parts, and in which.

Figure 1:
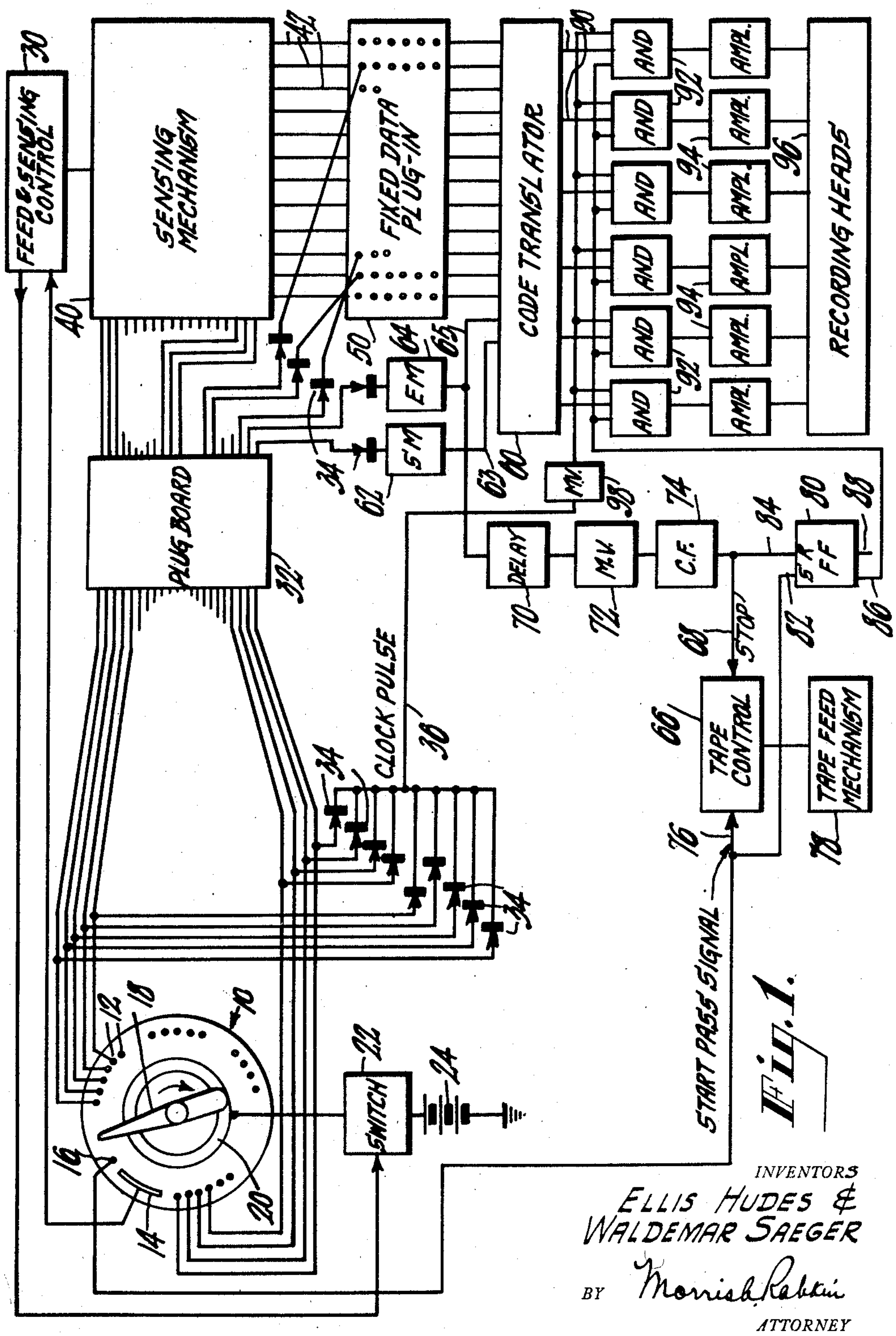
Fig. 1 is a schematic diagram partially in block form of a preferred embodiment of the invention.

Referring to Fig. 1, a rotary commutator 10 is provided with the number of contact points desired for formation of complete messages. In this embodiment there are eighty characters on the punched cards and a maximum of eighty additional fixed data characters desired, so the commutator has 160 commutator segments 12. The commutator 10 also has a blanking segment 14 and a start pass signal segment 16, and its commutator arm 18 is coupled through a slip ring 20 and a switch 22 to a source of unidirectional potential 24. The switch 22 is governed by signals from a feed and sensing control 30, which in turn receives control signals through the coupling to the blanking segment 14 on the commutator 10.

Each of the commutator segments 12 is coupled to a plugboard 32, and also through rectifying elements 34 to a single clock pulse lead 38. The connections at the plugboard 32 may be rearranged in any desired fashion. Eighty leads, or any desired lesser number, are coupled from the plugboard 32 to separate input points in a sensing mechanism 40. The sensing mechanism 40 has twelve output leads 42, one for each position in the vertical columns of a card to be sensed. These output leads 42 are coupled to a fixed data plug-in station 50. Other leads from the plugboard 32 output may also be coupled, through rectifying elements 34, to this plug-in 50.

The outputs of the fixed data plug-in station 50 are coupled to a code translator 60. Code translators are well known in the art and are shown and described generally in chapters 4 and 15 of the book "High-Speed Computing Devices," published by the McGraw Hill Book Company. They operate to provide a significant pattern of output pulses on a plurality of output leads in response to a different pattern of input pulses on a different number of input leads. The code translator 60 employed here produces character signals in a six-digit binary code in response to a twelve position punched card code. This binary code represents the numbers from 0 to 9 by their binary equivalents, and assigns to each alphabetic character one of the sixty-four total numbers available with a six-digit binary code. This code also assigns significant combinations to start message and end message symbols, which are used to distinguish between messages serially recorded on tape. Thus start message signals are taken directly from the plugboard 32, and directed, through a rectifying element 34, and a separate lead 62 to a separate input 63 on the code translator 60. The end message signal lead 64 is connected to a separate input 65 on the code translator 60 and also to a stop input 68 of a tape control device 66 through a delay unit 70, a one-shot multivibrator or slide-back trigger circuit 72, and a cathode follower 74. The start pass signal lead 76 of the tape control 66 is coupled to the start pass segment 16 on the commutator 10. The tape control 66 output impulses govern a tape feed mechanism 78. The start pass segment 16 is also coupled to the set input 82 of a bistable multivibrator 80. This multivibrator 80 also has a reset input 84. Outputs 86, 88 of the multivibrator 80 correspond respectively to each stable state.

The six output channels 90 of the code translator 60 are connected through separate "and" gates 92 and amplifiers 94 to the recording mechanism 96. The recording mechanism employed with the preferred embodiment is a group of heads for recording on magnetic tape. It will be evident, however, that other recording mechanisms, such as tape punching devices, may be used.

The three-input "and" gates 92 employed in the preferred embodiment may be of the type shown and described in chapter 4 of the book "High-Speed Computing Devices" referred to above. These "and" gates produce an output signal in response to input signals applied to simultaneously all three of their inputs, and not otherwise. The remaining two inputs of each gate are coupled to the set state output 86 of the bistable multivibrator 80, and, through a one-shot multivibrator 98, to the clock pulse lead 36.

Figures 2, 3:
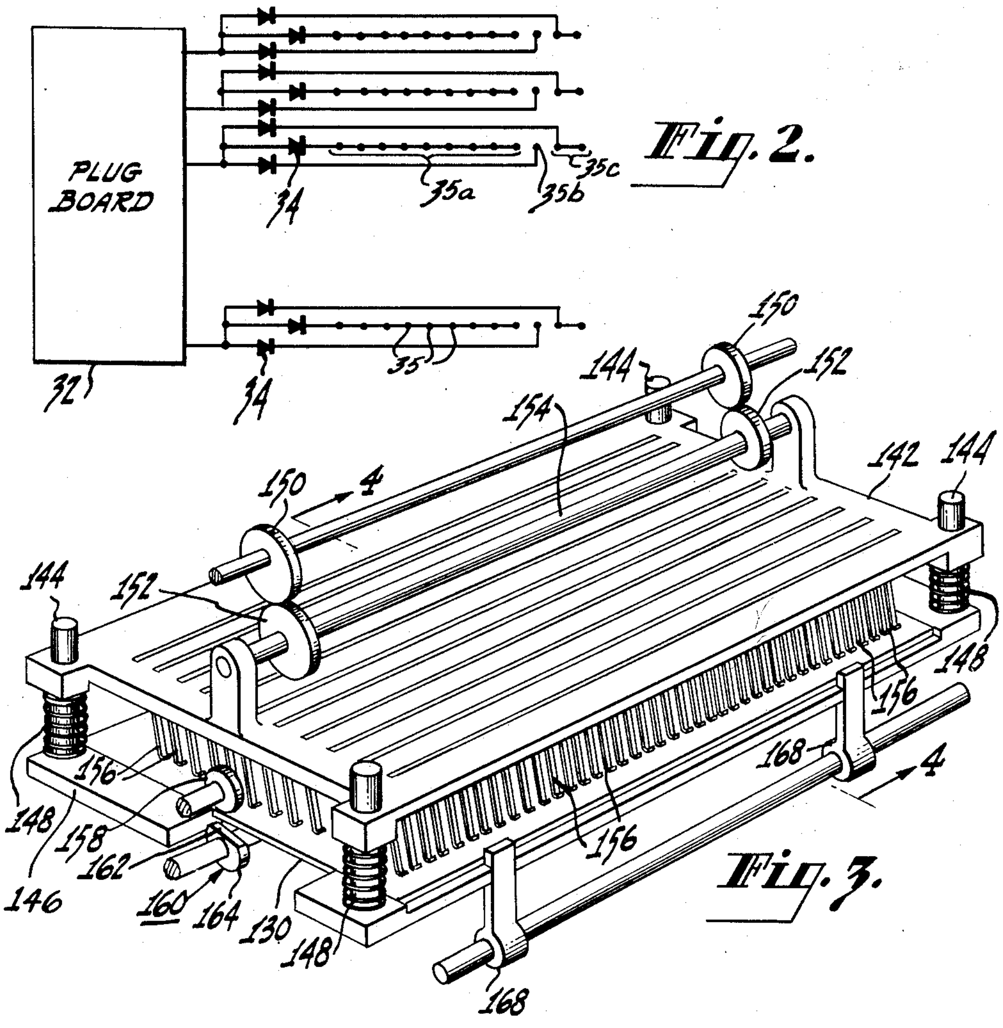
Fig. 2 is a partial view of the plugboard and sensing mechanism, showing how connections are made between the plugboard and sensing points.
Fig. 3 is a perspective view of the static sensing mechanism.

The manner in which the plugboard outputs are coupled to the sensing points or locations 35 on the sensing mechanism is shown in Fig. 2. Referring to that figure, the twelve individual sensing points 35 in a card column are there shown disposed horizontally. The twelve points are arranged in three groups, 35*a* (of nine points), 35*b* (of one point), and 35*c* (of two points), some signals in combination from some of the twelve points being used, in this case, to code all the numbers and characters normally employed. Thus where numbers from 1 to 9 are represented by a single pulse in the group of nine 35*a*, characters may then be represented by a signal in the group of nine 35*a* plus a signal in one of the other groups 35*b* or 35*c*. The details of this or similar systems as thus far described are well known, and therefore need not be further delineated here. Rectifying elements 34 are employed in the leads from the plugboard 32 to each group 35*a*, 35*b*, or 35*c*, and the individual sensing points 35 of these groups are located at the bottom of the sensing mechanism 40.

Figure 4:
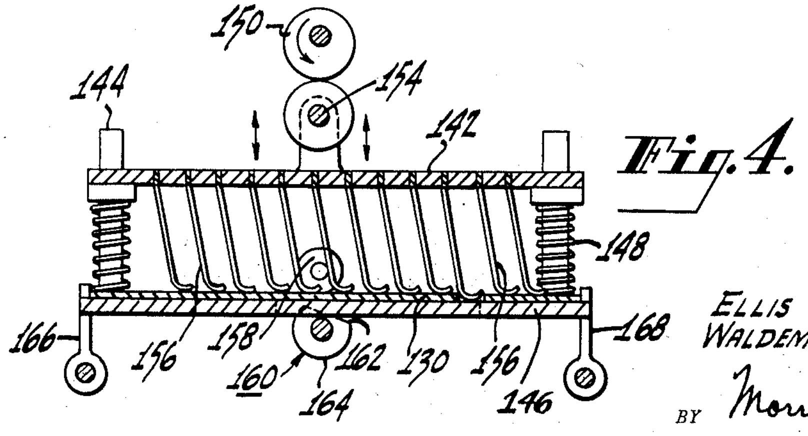
Fig. 4 is a sectional view of the sensing mechanism, taken along the line 4—4 of Fig. 3.

The construction of the static sensing mechanism 40 will be better understood from the perspective view of Fig. 3 and the sectional view of Fig. 4. A top sensing plate 142 moves vertically on four corner posts 144 mounted on a bottom sensing plate 146. The top sensing plate 142 is urged upwards by springs 148 surrounding the corner posts 144, and is intermittently pressed downward by the cam rollers 150. The cam rollers 150 contact opposing cam follower rollers 152 on a shaft 154 mounted on the top sensing plate 142.

The contact elements 156 are mounted in twelve rows in the top sensing plate 142. All eighty contact elements 156 in a row are coupled together, each to a lead 42. (See also Fig. 1.) Each lead 42 passes through a succeeding fixed data plug-in 50. It will be understood that for clarity in the drawing all eighty contacts have not been shown.

Card feed rollers 158, 160 (Fig. 3) and card stops 166, 168 are mounted on shafts whose rotative movement is synchronized with the associated card feed mechanism. Such mechanisms, and the structures for synchronizing the card feed and sensing plate motions, are well known to those skilled in the art and their mode of operation need not be repeated here.

In operation, referring to Fig. 1, the presence of a card at the feed and sensing control 30 directs an initial impulse to the switch 22. This impulse from the feed and sensing control 30 may be created in one of several well known ways, as by photoelectric or mechanical detection. The switch 22 closes in response to the received impulse and couples the slip ring 20 of the commutator 10 and the source of unidirectional potential 24. The commutator arm 18 rotates continuously in a clockwise direction, and on reaching the blanking segment 14 a circuit is closed between the source of unidirectional potential 24 and the feed and sensing control 30. This potential actuates the card feed in a well known manner, causing a card 130 (Fig. 3) to be fed into the sensing mechanism 40 and, shortly thereafter, causing the top sensing plate 142 to be lowered until the contact elements 156 are in operative relation to the bottom sensing plate 146.

Referring again to Fig. 1, the commutator arm 18 rotates further to the start pass signal segment 16, where it closes a circuit between the unidirectional potential source 24 and the start pass signal lead 76. This supplies a potential to the tape control 66, which in turn causes the tape feed mechanism 78 to start the tape moving. The potential is also supplied to the set input 82 of the bistable multivibrator 80, causing it to switch to an output on the set side 86. This output primes one input of each of the three-input "and" gates 92, and partially readies the gates for subsequent operation. Thus the detection of a card commences a synchronized action in which the card is fed into the sensing mechanism, the contact positions are sensed, the tape is begun moving, and the "and" gates are primed for operation.

Therefore, when the commutator arm 18 reaches the first commutator segment 12 as it rotates clockwise, the system is prepared for the distribution of sensing impulses. The first commutator pulse is usually directed through the plugboard 32 and used to create a start message signal at the code translator 60. This first pulse is thus passed directly to a special input 63 on the code translator 60. The first pulse and all succeeding pulses provide a series of clock pulses at the clock pulse lead 36. Each pulse is shaped on the clock pulse lead 36 by the one-shot multivibrator 98 and sent to one input of the three-input "and" gates 92. Since a continual signal is being received at all times after the start pass signal from the set state output 86 of the bistable multivibrator 80, the signal on the clock pulse lead 36 provides the additional prime necessary for the three-input "and" gates 92 to produce an output on receiving a pulse from the code translator 60.

We may assume here that the first commutator pulse has been used to create a start message signal, and we may assume also that a second pulse is to be used to read a certain card column position. The second pulse then proceeds through the plugboard 32 to the selected column of card positions. As seen in Fig. 2, the output from the plugboard is divided into three parallel lines to distinguish the three sensing position groups. Rectifying elements 34 are placed in these lines, as in the clock pulse and fixed data plug-in circuits, to eliminate the possibility of unwanted return currents in the system.

The second pulse arrives at all twelve contact positions in a selected column, and passes the contact elements only where a hole has been punched in the card. Referring particularly to the example shown in Fig. 4, it will be seen that with the top sensing plate 142 down only the third contact from the right has encountered a perforation in the card 130, thus closing a contact between the upper and lower sensing plates 142, 146. Thus this contact is the only one in the example shown which passes a pulse through the common coupling of all eighty elements in that row. This pulse passes through the fixed data input plug-in 50, and then passes to the code translator 60. In the code translator 60 the activation of the particular input causes creation of several distinct output pulses, according to the character represented. The pulses which are so created pass the three-input "and" gates 92, which have already been primed as stated above, and are then increased in amplitude by the amplifiers 94. Finally, these output pulses activate the recording mechanism 96.

Any commutator pulse which is directed to the fixed data plug-in 50 instead of the sensing mechanism 40 activates one or two of the channels at the plug-in. It will be understood that although only single leads from any position of plugboard 32 to the fixed data plug-in 50 have been shown, parallel lines can be employed to a plurality of inputs to the fixed data plug-in 50 wherever desired.

The last pulse of the 160 pulses, or any previous pulse, may be selected as the pulse for the end message signal. If not all the available pulses are to be used, the excess leads need only be disconnected from the plugboard 32 output. The end message pulse enters a special input 65 to the code translator 60, where the special end message signal is generated and directed to the recording heads 96. The end message pulse is also delayed by a delay unit, 70, formed in a one-shot multivibrator 72 and cathode follower 74 and used to activate the stop input 68 of the tape control 66. The delay allows time for recording the end message signal. As a result of the stop input activation, the tape is stopped shortly after the receipt of the end message signal, and the device awaits the receipt of another card. The tape could of course run continually, or be activated by other conditions than those employed here. The arrival of the end message pulse also resets the bistable multivibrator 80, causing a termination of one of the inputs to the three-input "and" gates 92. Thus after an end message pulse no more can be written on the recording tape without a start pass pulse, which in turn depends upon the availability of another punched card for reading. This then completes the cycle of operation.

The sensing mechanism provides a coordinated movement and reading of the cards. Referring to Figs. 3 and 4, when the top sensing plate 142 is held in the up position, a card 130 is fed in from the left. The left hand card stop 166 at this point is turned down, permitting free card ingress. When the card 130 enters between the card feed rollers 158, 160 it is gripped by those rollers and fed through to the right hand card stop 168. At this point the flat surface 162 on the lower card feed roller 160 opposes the upper roller 158 and the card 130 is no longer moved. The left hand card stop 166, however, rises to index the card for sensing.

As the card 130 is held stationary for this brief period, the cam rollers 150 force down the top sensing plate 142, causing the contact elements 156 to make contact wherever there is a hole punched in the card 130. During the time the brushes 156 are held down the commutating cycle of 160 segments is completed. Then the top sensing plate 142 rises, the card stops 166, 168 both rotate down, the curved portion 164 of the lower card feed roller 160 again contacts the upper card feed roller 150, and the read card 130 is ejected so that a new cycle can begin.

It will be evident to those skilled in the art that various modifications may be made in the structure shown without affecting the advantages of the invention. Electronic commutating means may be employed where even faster sensing is desired. The method of fixed data insertion may be altered, or fixed data insertion may be increased or eliminated completely. Synchronization of tape movement with card feeding may take many forms, or, as stated previously, the tape may be moved continuously. The codes and numerical examples given are not fundamental to the system.

Thus there has been described a simple and reliable means for rapidly sensing and utilizing the information encoded on punched cards. By the simultaneous sensing of all data bearing positions and the commutation of sensing pulses, the card column positions may be read in any order, and fixed data inserted as desired.

What is claimed is:

1. A device for reading the coded record in a perforated card having a coordinate array of perforation positions comprising means for simultaneously sensing the perforations on said card while said card is stationary, electrically conductive paths controlled by said sensing means, said paths each having an input and an output, said inputs coupling together perforation positions in one coordinate direction and said outputs coupling together perforation positions in the other coordinate direction, commutating means for supplying sequential pulses in different pulse paths, and means for selectively coupling said pulse paths to said inputs.

2. A device for reading the coded record in a perforated card having a coordinate array of perforation positions comprising means for simultaneously sensing the perforations on said card while said card is stationary, electrically conductive paths controlled by said sensing means, said paths each having an input and an output, said inputs coupling together perforation positions in one coordinate direction and said outputs coupling together perforation positions in the other coordinate direction, commutating means for supplying sequential pulses in different pulse paths, and means for selectively coupling said pulse paths to the said inputs, said sensing means including a plurality of individual contact elements and said selective coupling means including a plugboard.

3. A system for reading, rearranging, and converting the coded record in a perforated card having a coordinate array of perforation positions, said system comprising means for transporting said card, means for simultaneouly sensing the coding on said perforated card, electrically conductive paths controlled by said sensing means, said paths each having an input and an output, said inputs coupling together perforation positions in one coordinate direction and said outputs coupling together perforation positions in the other coordinate direction, commutating means for supplying sequential pulses in different pulse paths, means for selectively coupling said pulse paths to said inputs, and means coupled to said conductive path outputs for converting pulse patterns existing on said outputs into a different code.

4. A system for sensing coded information recorded in a coordinate array of positions on a perforated statistical card and translating the information in rearranged form to a different code, with the inclusion of added fixed data, comprising a bottom sensing plate, means for positioning a card on said plate, a top sensing plate spaced from said bottom plate, a coordinate array of contact elements mounted in said top sensing plate, means for intermittently moving said top plate to bring said contact elements into contact with said bottom sensing plate and in register with the card perforation positions, sensing input means coupling the perforation positions of each line in one coordinate direction on said bottom sensing plate, sensing output means coupling the contact sensing elements of each line in the other coordinate direction, commutating means for supplying a sequence of pulses in different paths, means for selectively coupling each of said paths to said sensing input means, and means coupled to said sensing output means for converting pulse patterns existing on said means into said different code.

5. A system for sensing coded information recorded in a coordinate array of positions on a perforated statistical card and translating the information in rearranged form to a different code, with the inclusion of added fixed data, comprising a bottom sensing plate, means for positioning a card on said bottom plate, a top sensing plate spaced from said bottom plate, a coordinate array of contact elements mounted in said top sensing plate, means to urge said contact elements into contact with said bottom sensing plate and in register with the card perforation positions, sensing input means coupling the perforation positions of each line in one coordinate direction on said bottom sensing plate, sensing output means coupling the contact sensing elements of each line in the other coordinate direction, commutating means for supplying a sequence of pulses in different paths, a fixed data plug-in means coupled to said sensing output means, a code translator coupled to said fixed data plug-in means, and a plugboard selectively coupling said paths of said commutating means to said sensing input means, said fixed data plug-in means, and said code translator.

6. A system for transcribing the coded record on a perforated statistical card to a tape recording medium with the inclusion of added fixed data comprising means for intermittently transporting said card, means for simultaneously sensing the coding on said statistical card while said card is stationary, means coupled to said card transport means for moving said tape storage medium while said card is stationary, electrically conductive paths controlled by said sensing means, said paths each having an input and an output, commutating means for supplying a sequence of pulses in different pulse paths, fixed data plug-in means coupled to said sensing output means, a code translator coupled to said fixed data plug-in means, a plugboard selectively coupling said pulse paths of said commutating means to said sensing input means, said fixed data plug-in means, and said code translator, and means responsive to said code translator for recording on said said tape recording medium.

7. A system for sensing coded information recorded in a coordinate array of positions on a perforated statistical card, translating the information in rearranged form to a different code with the inclusion of added fixed data, and recording the revised information on a tape recording medium, comprising a bottom sensing plate, means for momentarily positioning a card on said bottom plate, a top sensing plate spaced from said bottom plate, a coordinate array of contact elements mounted in said top sensing plate, cam means coupled to said positioning means for intermittently moving said top plate to bring said contact elements into contact with said bottom sensing plate and in register with the card perforation positions while said card is positioned on said bottom plate, input couplings connecting the perforation positions of each line in one coordinate direction on said bottom sensing plate, output couplings connecting the contact sensing elements of each line in the other coordinate direction, means coupled to said positioning means for moving said tape recording medium while said card is positioned on said bottom plate, fixed data plug-in means coupled to said output couplings, a code translator connected to said fixed data plug-in means, commutating means for supplying a sequence of pulses in different pulse paths, a plugboard selectively coupling said pulse paths to said input couplings, said fixed data plug-in means, and said code translator, and means responsive to said code translator for recording on said tape recording medium.

8. The invention as set forth in claim 7, wherein said coordinate array of card positions includes a plurality of columns and rows, and wherein each of the lines in the said one coordinate direction is a said column, each of the lines in the said other coordinate direction is a said row, and wherein said code translator provides plural-channel pulse output patterns.

References Cited in the file of this patent

UNITED STATES PATENTS 2,493,858 Carroll et al. ------------ Jan. 10, 1950
2,651,461 Luhn ------------------ Sept. 8, 1953